US006930776B2

United States Patent
He et al.

(10) Patent No.: US 6,930,776 B2
(45) Date of Patent: Aug. 16, 2005

(54) HIGH OPTICAL REJECTION OPTICAL SPECTRUM ANALYZER/ MONOCHROMATOR

(75) Inventors: Gang He, Quebec City (CA); Daniel Gariépy, Stoneham (CA)

(73) Assignee: EXFO Electro-Optical Engineering Inc., Vanier (CA)

( * ) Notice: Subject to any disclaimer, the term of this patent is extended or adjusted under 35 U.S.C. 154(b) by 182 days.

(21) Appl. No.: 10/625,528

(22) Filed: Jul. 24, 2003

(65) Prior Publication Data

US 2005/0073679 A1 Apr. 7, 2005

Related U.S. Application Data

(60) Provisional application No. 60/398,110, filed on Jul. 25, 2002.

(51) Int. Cl.[7] .................. G01J 3/18; G01J 3/28
(52) U.S. Cl. ............... 356/328; 356/327; 356/333; 356/334
(58) Field of Search .................. 356/326, 327, 356/328, 332, 333, 334

(56) References Cited

U.S. PATENT DOCUMENTS 5,233,405 A    8/1993   Wildnauer et al.
5,886,785 A    3/1999   Lefevre et al.
6,177,992 B1 * 1/2001   Braun et al. ............ 356/327
6,337,940 B1   1/2002   Lefevre
2001/0030745 A1 10/2001 He et al.

FOREIGN PATENT DOCUMENTS

CA        2315452      2/2001

* cited by examiner

Primary Examiner—F. L. Evans
(74) Attorney, Agent, or Firm—Thomas Adams (57) ABSTRACT

A dual-channel, double-filtering, multi-pass OSA having a narrow spectral linewidth response and high ORR comprises a diffraction grating (DG), two input ports (P1', P1") for directing first and second input light beams (LR, LT) onto the grating; a retroreflector (RAM1) for returning the dispersed light beams to the grating for dispersion again; two intermediate output ports (P2', P2") for receiving the twice-dispersed light beams; two secondary input ports (P3', P3") coupled to the intermediate output ports by polarization-maintaining waveguides (PMF2', PMF2") for directing the light beams onto the grating a third time, with their SOPs having a predetermined orientation relative to the SOPs of the first and second light beams when first incident upon the grating, the retroreflector (RAM1) returning the three-times-dispersed light beams to the grating for dispersion a fourth time; and two output ports (P4', P4") for receiving the light beams after dispersion the fourth time.

17 Claims, 10 Drawing Sheets

OPTICAL BLOCK WITH ADDRESSING MEANS AND
COLLIMATING AND FOCUSING OPTICS

FIG. 5

ALTERNATE OPTICAL BLOCK WITH ADDRESSING
MEANS AND COLLIMATING AND FOCUSING OPTICS

FIG. 10

FIG. 11   LINEWIDTH FILTER RESPONSE AFTER FIRST SERIES OF PASSAGES
(STAGE 1-P1' AND P1" TO P2' AND P2")

FIG. 12

LINEWIDTH FILTER RESPONSE OF SECOND SERIES OF PASSAGES ONLY
(STAGE 2-P3' AND P3" TO P4' AND P4")

FIG. 13

FULL OSA SPECTRAL RESPONSE (2 SERIES OF PASSAGES IN MONOCHROMATOR, OUTPUT AT P4' AND P4")

FIG. 14  FULL OSA SPECTRAL RESPONSE SHOWING NO OPTICAL NOISE FLOOR LIMITATION*; ONLY THE PRESENCE OF AN ELECTRONIC NOISE FLOOR IS VISIBLE

HIGH OPTICAL REJECTION OPTICAL SPECTRUM ANALYZER/ MONOCHROMATOR

CROSS REFERENCE TO RELATED APPLICATION

This application claims priority from United States Provisional patent application Ser. No. 60/398,110 filed Jul. 25, 2002, the contents of which are incorporated herein by reference.

TECHNICAL FIELD

This invention relates to optical spectrum analyzers and monochromators of the kind which use a diffraction grating. The invention is especially applicable to optical spectrum analyzers, and to monochromators for use therein, in which a light beam to be analyzed is applied to the diffraction grating more than once so as to obtain improved resolution.

BACKGROUND ART

The invention is concerned especially with high performance diffraction grating-based optical spectrum analyzers (OSA) and monochromators. U.S. Pat. No. 5,233,405 (Wildnauer et al.), for example, discloses a double-pass, double-filtering monochromator using a Littrow configuration that has a waveplate positioned in the middle of the monochromator so that the light impinges upon the grating a second time with a polarization state orthogonal to the state of polarization when it impinged upon it the first time to reduce the PDL in combination with using a Littrow configuration with a grating having a small number of lines, which limits the resolution for a given size.

Optical spectrum analyzers that use different techniques for polarization management to achieve better resolution for a given size have been disclosed in U.S. Pat. No. 5,886,785 issued Mar. 1999 naming Lefevre et al. as inventors and in U.S. patent application Ser. No. 20010030745 filed Jan. 2000 naming He et al. as inventors.

Both their designs have advantages and weaknesses that are complementary, but they both suffer from important limitations with regard to the optical rejection ratio (ORR) and, at different levels, the noise floor. In the case of the He et al's OSA described in U.S. 20010030745, these limitations arise from the fact that the light is filtered only once, even after two passes on the grating.

In one embodiment (shown in their FIG. 8), Lefevre et al. use a second retro-reflector to double the number of passes of the grating. Although this leads to a reduced spectral linewidth response, the resulting optical spectrum analyzer still has a limited level optical noise floor and its optical rejection ratio (ORR) is not improved; it is, in fact, degraded by the extra loss incurred while the noise floor remains unchanged.

In U.S. Pat. No. 6,337,940, Lefevre discloses an OSA having the same basic features as that shown in FIG. 8 of U.S. Pat. No. 5,886,785, but which also filters the light a second time. This approach has the advantage of very high ORR filter response close to the peak, but the ultimate noise floor is limited by back-reflection from the common input and output lens, a limitation that becomes important when multiple signal wavelengths are to be analyzed, as is the case in DWDM systems that, in practice, require the high ORR. Other limitations include the use of large expensive components, the size/cost of the polarization beam splitter (120) within the monochromator section limiting the ultimately achievable filter response linewidth and the need for the components to be precisely polished to ensure that the optical beams of both polarizations can be recombined at the output of the monochromator.

While it might be possible to improve the spectral linewidth response for both these approaches by increasing the component dimensions (namely the lenses' focal lengths and the diffraction grating surface and, for Lefevre et al., the polarizing beam splitter), it would be at the expense of a larger occupied volume, higher cost and greater mounting difficulty.

DISCLOSURE OF INVENTION

The present invention seeks to substantially avoid at least some of the afore-mentioned disadvantages and to provide a compact optical design of optical spectrum analyzer/ monochromator advantageously having both a narrow spectral linewidth response and extremely high optical rejection ratio, especially near the peak.

According to one aspect of the present invention, a dual-channel, double-filtering, multi-pass, optical spectrum analyzer comprises:

(i) a diffraction grating;

(ii) first and second input ports (P1', P1") for directing first and second input light beams (LR, LT), respectively, onto the diffraction grating in a first plane for dispersion a first time;

(iii) polarization-decomposing means (PDM) for decomposing a single light beam into first and second components having mutually-orthogonal linear states of polarization and supplying said first and second components to said first and second input ports as said first and second input light beams (LR, LT), respectively, (iv) a retroreflector means (RAM1) for receiving the first and second dispersed light beams and returning same to the diffraction grating in a second plane for dispersion a second time;

(v) first and second intermediate output ports (P2', P2") for receiving the first and second twice-dispersed light beams, respectively;

(vi) first and second secondary input ports (P3', P3") coupled to the first and second intermediate output ports, respectively, by polarization-maintaining waveguide means (PMF2', PMF2") and for directing the twice-dispersed first and second light beams onto the diffraction grating in a third plane for dispersion a third time, with their states of polarization having a predetermined orientation relative to the states of polarization of the first and second light beams when first incident upon the diffraction grating, the retroreflector means (RAM1) reflecting the three-times-dispersed first and second light beams back to the diffraction grating means in a fourth plane for dispersion a fourth time;

(vii) first and second output ports (P4', P4") for receiving the first and second light beams, respectively, after dispersion the fourth time, the first, second, third and fourth planes being parallel to each other and the dispersion plane and spaced from each other in a direction perpendicular to the dispersion plane;

(viii) means (TT) for rotating at least one of the first retroreflector and the grating to effect wavelength scanning;

(ix) first and second detectors (D', D") for receiving the first and second light beams from the first and second output ports (P4', P4"), respectively, and converting same to first and second electrical signals, respectively; and (x) microprocessor means (MP) coupled to said rotating means (TT) and to the detectors (D', D") for controlling rotation of the first retroreflector (RAM1) and processing the first and second electrical signals;

the arrangement being such that, each time the first and second light beams are incident upon the diffraction grating; their linear states of polarization are substantially parallel to each other and the dispersion planes for all wavelengths within an operating band of the optical spectrum analyzer.

According to a second aspect of the present invention, a dual-channel, double-filtering, multi-pass monochromator comprises:

(i) a diffraction grating;

(ii) first and second input ports for directing first and second input light beams, respectively, onto the diffraction grating in a first plane for dispersion a first time;

(iii) a retroreflector means for receiving the first and second dispersed light beams and returning same to the diffraction grating in a second plane for dispersion a second time;

(iv) first and second intermediate output ports for receiving the first and second twice-dispersed light beams, respectively;

(v) first and second secondary input ports coupled to the first and second intermediate output ports, respectively, by polarization-maintaining waveguide means for directing the twice-dispersed first and second light beams onto the diffraction grating in a third plane for dispersion a third time, with their states of polarization having a predetermined orientation relative to the states of polarization of the first and second light beams when first incident upon the diffraction grating, the retroreflector means reflecting the three-times-dispersed first and second light beams back to the diffraction grating means in a fourth plane for dispersion a fourth time; and (vi) first and second output ports for receiving the first and second light beams, respectively, after dispersion the fourth time, the first, second, third and fourth planes being parallel to each other and the dispersion plane and spaced from each other in a direction perpendicular to the dispersion plane.

Preferably, embodiments of either aspect of the invention further comprise a second retroreflector disposed so as to receive the first and second light beams from the diffraction grating and return them back along substantially the same path for dispersion again by the diffraction grating, reflection and displacement by the first retroreflector, and dispersion yet again by the diffraction grating, such that the first and second light beams are each dispersed six times and filtered twice during their passage between said first and second input ports and the first and second output ports, respectively.

The first and second secondary input ports and the first and second output ports may comprise a 2×2 rectangular fiber array (matrix) and share a common optical collimating/focussing means while remaining close to the optical axis of such optical collimating/focussing means.

In preferred embodiments, the first and second secondary input ports and the first and second output ports are disposed in two planes perpendicular to the diffraction plane of the grating and such that the first secondary input port and the first output port and the second secondary input port and the second output port lie in two other planes that are parallel to the diffraction plane, and the optical axis of the associated optical collimating/focussing means extends through the center of the rectangle formed by the four ports.

Alternatively, the first and second secondary input ports may comprise a first fiber array and share a common collimating lens means and the first and second output ports may comprise a second fiber array and share a common focussing lens means. Preferably, each fiber array positions the two ports in a plane perpendicular to the diffraction plane.

The polarization decomposing means may comprise means for effecting wavelength-independent rotation of one or both of the linear states of polarization of the first and second input light beams, preferably so that their respective linear states of polarization are aligned parallel to each other, the first and second input ports then being arranged to direct the first and second input light beams onto the diffraction grating, preferably with the linear states of polarization of the first and second input light beams both perpendicular to the grooves of the diffraction grating.

The polarization decomposing means may comprise a polarization beam splitter coupled to the monochromator section by a pair of polarization maintaining fibers. One or both of the polarization maintaining fibers may be twisted to provide a required rotation of the linear state of polarization of the light beam passing therethrough.

Either the grating or the first retroreflector, or both, could be rotatable to provide wavelength scanning.

Such an optical spectrum analyzer or monochromator would be characterized by polarization diversity, multiple passes on the diffraction grating and two filtering stages.

In effect, the first and second light beams pass through two monochromator stages in series. The first monochromator stage comprises: input port-collimating optics—grating—retroreflector (RAM1)—grating—intermediate output port. The second monochromator stage comprises: secondary input port—grating—retroreflector (RAM1)—grating—second retroreflector (RAM2)—grating—first retroreflector (RAM1)—grating—output port.

The collimating/focussing optical means of the second stage preferably has a longer focal length than that of the first stage, so as to reduce the angle from the optical axis resulting from the limited physical proximity of the four ports arranged on a rectangle, thus reducing aberrations and coupling losses by ensuring that the angle between the optical axis and the beams is kept small. This also keeps the spot sizes of the two beams small which allows a narrow line width response to be achieved.

The collimating/focusing optical means with the longer focal length could, of course, be in either the first stage or the second stage but, in either case, preferably the fiber array (of four ports) is associated with the longer focal length optical means.

The first and second input light beams may be incident upon the grating with their linear states of polarization having any prescribed angle with respect to a corresponding plane of diffraction/dispersion.

It should be understood that the foregoing more-specific combinations of features may be employed in either the optical spectrum analyzer of the first aspect of the invention or the monochromator of the second aspect.

In this specification, the term "grooves" embraces both the physical grooves in a surface relief grating (ruled or holographic) and their functional equivalent in, for example, an index modulated patterned grating.

Various features, advantages and objects of the invention will become apparent from the following description of preferred embodiments which are described, by way of example only, with reference to the accompanying drawings.

BEST MODE(S) FOR CARRYING OUT THE INVENTION

Figure 1:
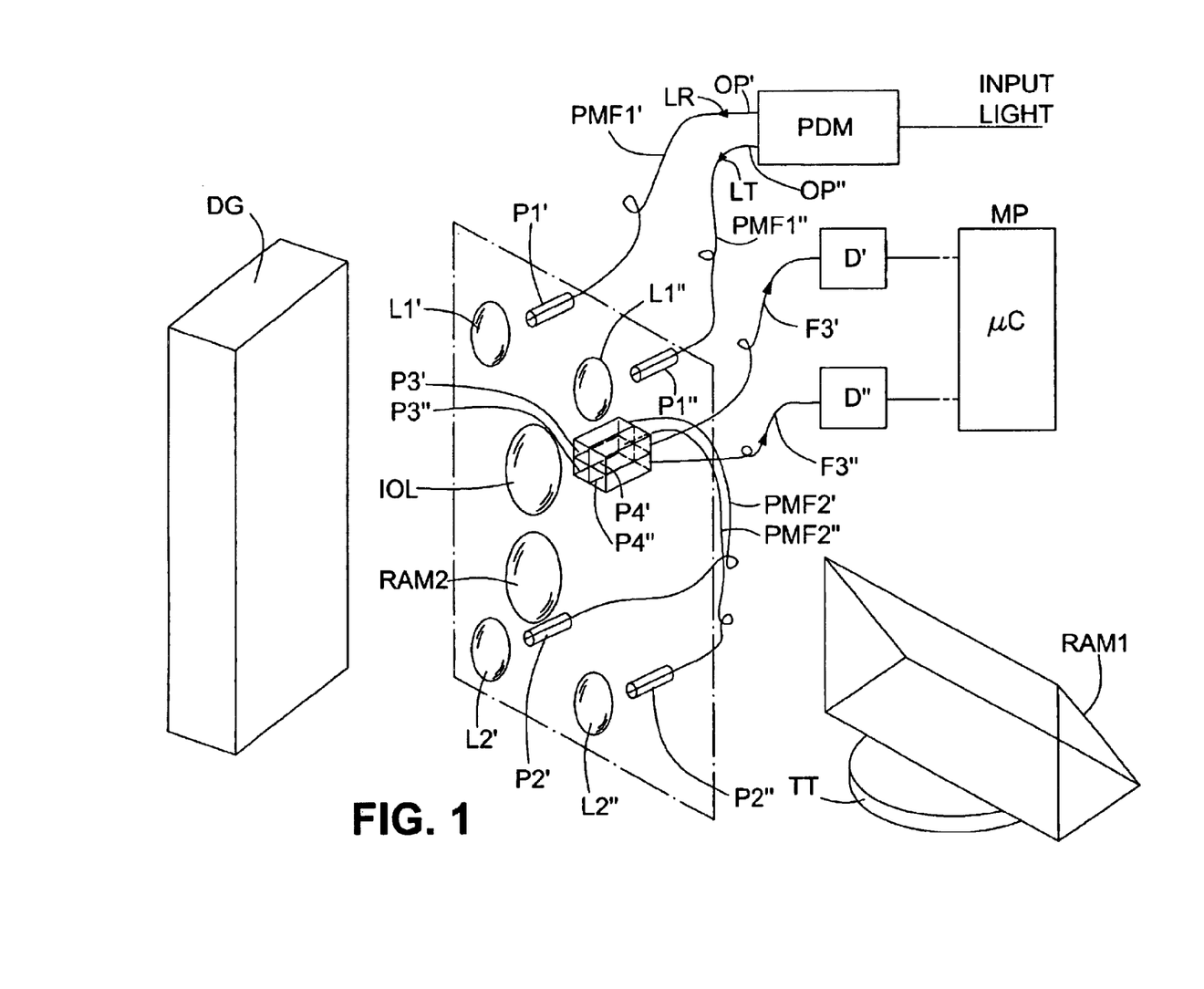
FIG. 1 is a simplified schematic perspective diagram of a first embodiment of the invention which is an optical spectrum analyzer having a dual-channel, double-filtering, multi-pass monochromator.
Figure 2:
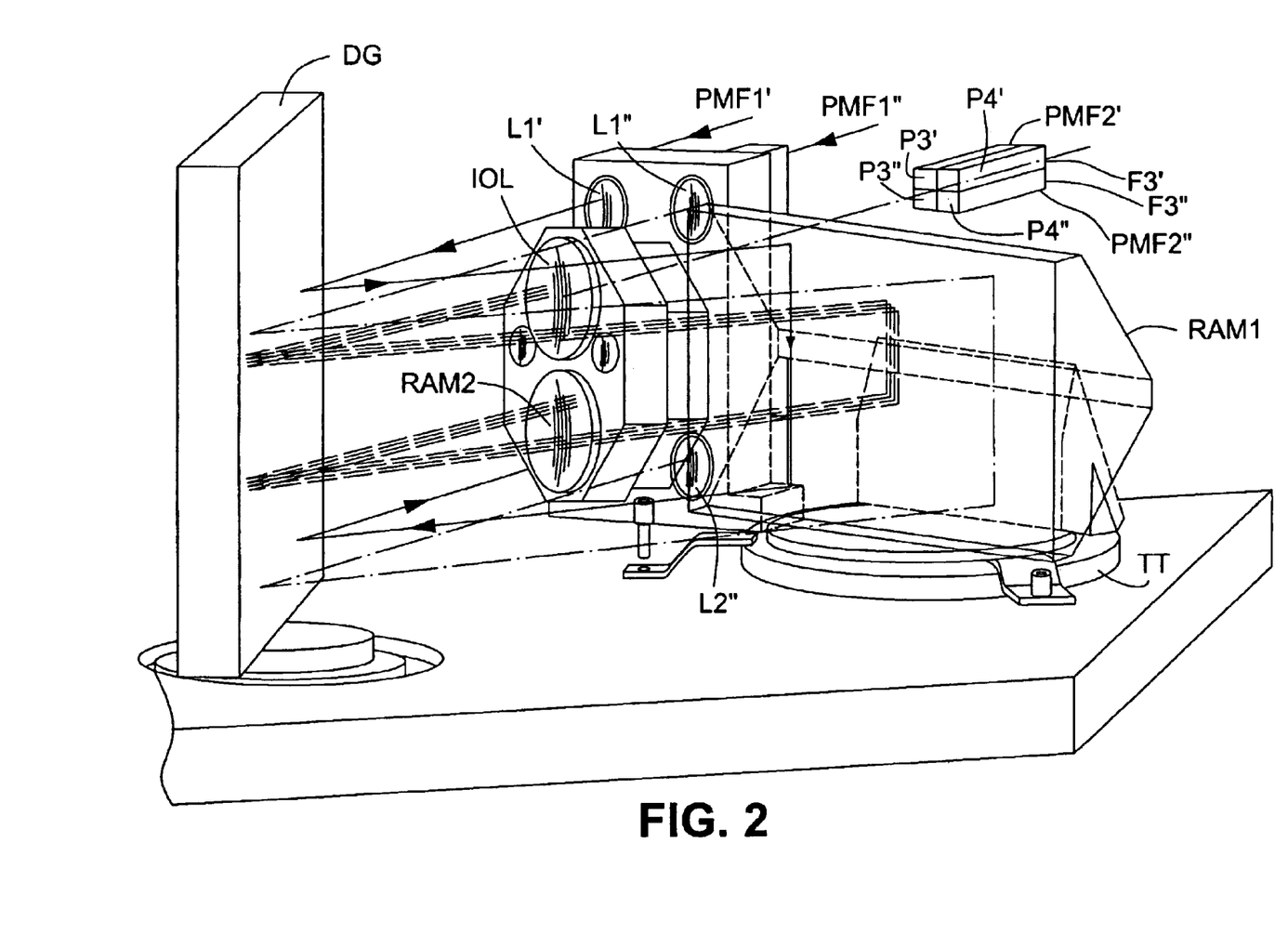
FIG. 2 is a schematic perspective diagram of the two-stage monochromator of the optical spectrum analyzer of FIG. 1, showing paths taken by light beams therein.
Figure 3:
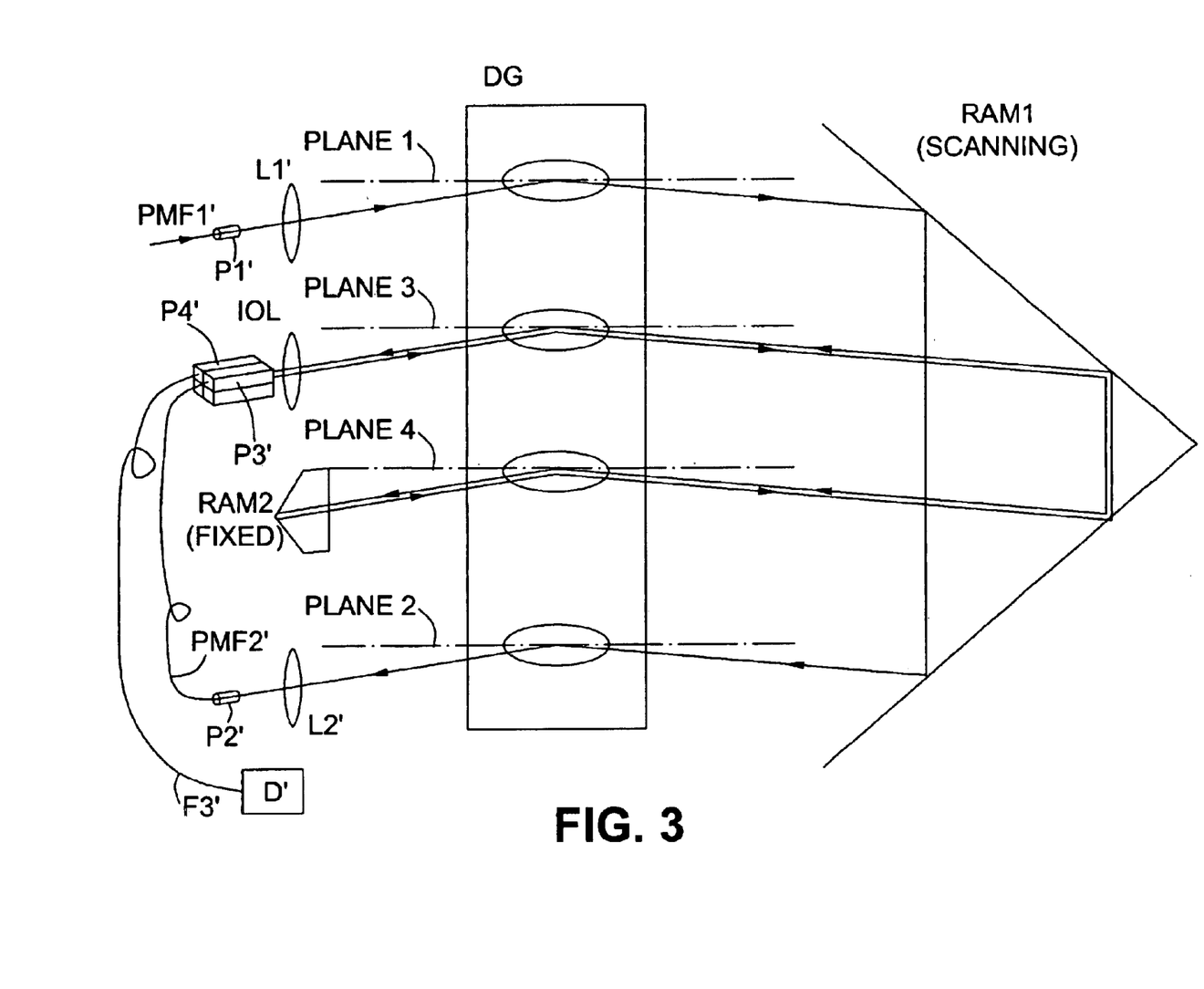
FIG. 3 is a simplified schematic diagram of one channel of the two-stage monochromator of the optical spectrum analyzer of FIGS. 1 and 2, showing the path taken by one light beam.
Figure 4:
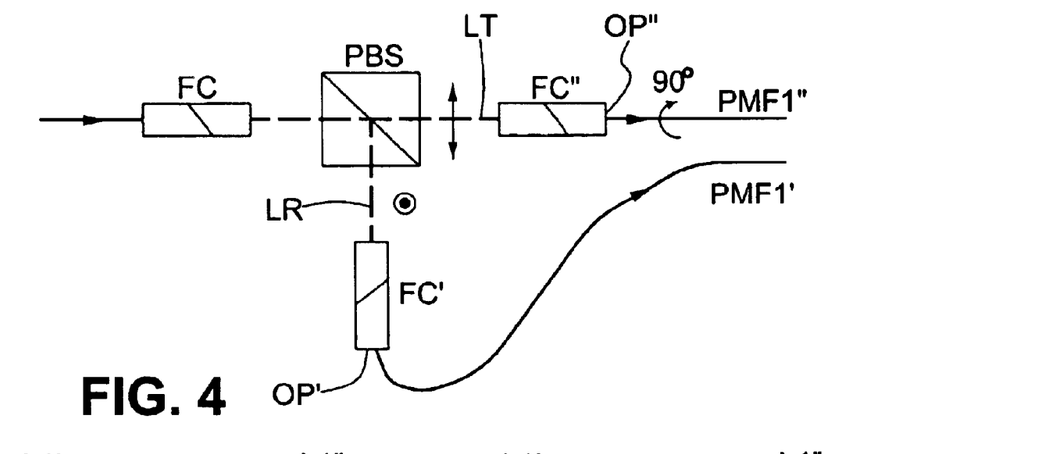
FIG. 4 is a simplified schematic drawing of a polarization decomposing means of the optical spectrum analyzer.
Figure 5:
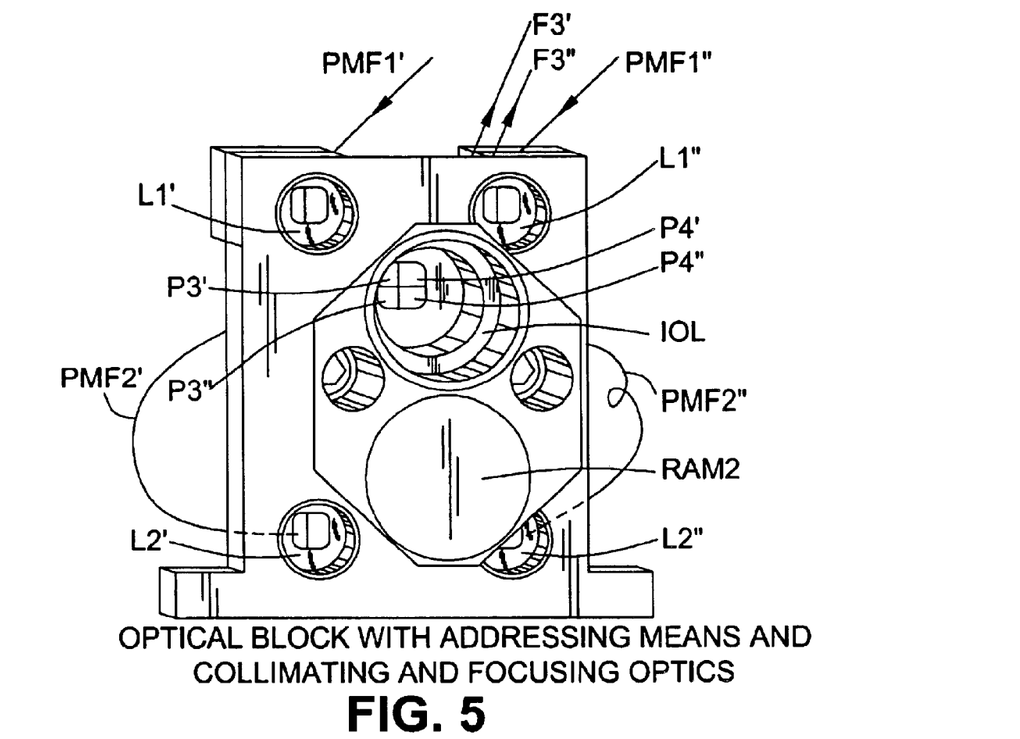
FIG. 5 is a front view of an optical block of the OSA of FIGS. 1 and 2 with ports and collimating/focusing optics.

Referring to FIGS. 1 to 5, an optical spectrum analyzer comprises a wavelength-independent polarization decomposition means, or demultiplexer unit PDM (shown in FIGS. 1 and 4 but not in FIG. 2), a monochromator section, and a pair of detectors D1, D2, which may be photodiodes. The detectors D1, D2 are coupled, separately, to a microprocessor MP (FIG. 1). As shown in FIGS. 1 and 4, the wavelength-independent polarization demultiplexer PDM has an input port to which the input light beam for analysis is supplied via an optical fiber F and two output ports OP' and OP" for first and second light beams LR and LT, respectively, having mutually orthogonal linear states of polarization. The output ports OP' and OP" are coupled to the monochromator section by polarization-maintaining (PM) fibers PMF1' and PMF1", respectively, for conveying the first and second light beam components LR and LT to the monochromator section.

As shown in FIG. 4, the wavelength independent polarization demultiplexer PDM comprises three fiber collimators FC, FC1' and FC1" and a polarization beam splitter PBS. The fiber collimator FC receives the fiber-guided input light beam and converts it into a collimated, free-space beam which it directs to the polarization beam splitter PBS. The latter separates the input light beam into the two light beams LT and LR, respectively, having mutually-perpendicular linear states of polarization (SOPs) corresponding to original mutually perpendicular states of polarization in the input light beam. The polarization beam splitter PBS directs linearly polarized light beam LR to fiber collimator FC' and directs the complementary, orthogonal linearly-polarized light beam LT to fiber collimator FC". The fiber collimators FC' and FC" focus the two light beams LR and LT, respectively, into proximal ends of the polarization maintaining fibers PMF1' and PMF1", in each case with the linear state of polarization (SOP) of the launched light aligned with one of the birefringent axes ("slow" or "fast") of the associated one of the PM fibers PMF1' and PMF1". In this particular embodiment, for example, the fiber PMF1' conveys that portion of the initial beam energy corresponding to vertical linear polarization, while fiber PMF1" conveys that corresponding to horizontal linear polarization, as indicated in FIG. 4, which shows a top view of the PDM.

The two PM fibers PMF1' and PMF1" may be single mode or multi-mode at the wavelengths of operation. Referring again to FIGS. 1 and 2, the distal ends of polarization maintaining fibers PMF1' and PMF1" are terminated at, and fixed in, the fiber terminations at the input of the monochromator section MR as ports P1' and P1". Before fixing, one or both of the polarization-maintaining fibers PMF1' and PMF1" are manipulated to ensure that the linear state-of-polarization (SOP) of the light beams LT and LR exiting from the ends of these two fibers at P1' and P2" have a predetermined spatial orientation—in this specific case parallel to each other. An example of such a manipulation could be twisting of one of the two fibers with respect to the other. Thus, FIG. 4 shows the second polarization-maintaining fiber PMF1" is twisted through 90 degrees relative to fiber PMF1' so that, on arrival of the two linearly-polarized light beams LT and LR at the input ports P1' and P1", respectively, of the monochromator section MR, their linear states of polarization (SOP) are parallel to each other.

In addition to the input ports P1' and P1", and the input collimating lenses L1' and L1", the monochromator section comprises a pair of intermediate output focusing lenses L2' and L2", a shared collimating/focussing lens IOL, a scanning right-angled dihedral reflector RAM1, such as a roof mirror or Porro prism, mounted on a turntable TT, a reflecting diffraction grating DG, a fixed right-angled dihedral retroreflector RAM2, a pair of intermediate output ports P2' and P2", a pair of secondary input ports P3' and P3" and a pair of output ports P4' and P4" coupled to a pair of output fibers F3' and F3", respectively. It should be appreciated that the ends of each of the input fibers PMF1' and PMF1" and the proximal ends of fibers PMF2' and PMF2" serve as the input "slits" and output "slits", respectively, of a first monochromator stage. The distal ends of the fibers PMF2' and PMF2" and the proximal ends of output fibers F3' and F3" serve as the input "slits" and output "slits" of a second monochromator stage.

Secondary input ports P3' and P3" and output ports P4' and P4" comprise a fiber matrix (rectangular 2×2 array) disposed at the focal plane of collimating/focussing lens IOL.

The input ports P1' and P2" are disposed side-by-side in a first plane; the intermediate output ports P2' and P2"

side-by-side in a second plane; the secondary input ports P3' and P3" and the output ports P4' and P4" in pairs one above the other substantially in a third plane, and the fixed retroreflector RAM2 is in a fourth plane. The four planes are parallel to the dispersion plane but offset perpendicular thereto and relative to each other. Although, for purposes of description, the ports P3' and P4', and P3" and P4" are treated as being in the same plane, in practice they must be in closely neighbouring, but separate planes so as to avoid crosstalk. Likewise, their images on reflector RAM2 are in two, closely-neighbouring planes.

The input ports P1' and P1" direct the two polarized light beams LR and LT, respectively, onto collimating input lenses L1' and L1" of the first monochromator stage and are oriented so that the SOPs of the light beams will be parallel to the dispersion plane of the diffraction grating DG, i.e., perpendicular to the grating's grooves, when incident upon the diffraction grating DG. As they traverse the other components of the first monochromator stage, the two polarized light beams LR and LT follow similar, but not strictly parallel, paths. (For greater clarity, the path taken by only one of the light beams, i.e. LR, is shown in FIG. 3.)

Thus, on leaving the lenses L1' and L1", the collimated light beams LR and LT are directed onto the diffraction grating DG. Following reflection and diffraction by the diffraction grating DG, the light beams LR and LT are directed to the rotatable right-angled dihedral reflector RAM1. The arrangement is such that the light beams LR and LT impinge upon one of the facets of the dihedral reflector RAM1 at a first angle of the order of 45 degrees, and are reflected to the other facet, which reflects them again at the 90-degree complement of the first angle, such that they leave the dihedral reflector RAM1 in the opposite direction to that of their arrival and are incident upon the diffraction rating DG again, but at a position displaced perpendicularly with respect to the plane in which they were first incident. The diffraction grating DG reflects and diffracts the light beams LR and LT again and directs them onto intermediate output lenses L2' and L2", respectively, which refocusses them into the ends of fibers PMF2' and PMF2", respectively. That completes their travel through the first monochromator stage.

As fibers PMF2' and PMF2" convey the first and second light beams to secondary input ports P3' and P3" for entry into the second monochromator stage the respective states of polarization of light beams LR and LT are maintained. Ports P3' and P3" launch the first and second light beam components LR and LT into the second monochromator stage via shared collimating lens IOL which collimates them and directs them onto the grating DG slightly offset from each other in a direction perpendicular to the dispersion plane. Following diffraction a third time by the grating DG and reflection and displacement by the retroreflector RAM1, they are diffracted a fourth time by grating DG, reflected by second (fixed) retroreflector RAM2 back to the grating DG for diffraction a fifth time, reflected by RAM1 again, diffracted a sixth time and, finally, refocussed by shared lens IOL into output ports P4' and P4", respectively, which are coupled to the adjacent ends of output optical fibers F3' and F3", respectively.

The orientation of retroreflector RAM2 is such that it acts like a normal mirror to light incident upon it within a plane parallel to the dispersion plane. Consequently, the first light beam leaving first secondary input port P3' will be received by immediately-adjacent first output port P4'. The first secondary input port P3' and the first output port P4' are disposed in the associated dispersion plane, at substantially equal distances one each side of the optical axis. The second secondary input port P3" and the second output port P4" have a similar relationship to each other.

It should be appreciated that, each time each light beam component is diffracted by grating DG, the dispersion increases, resulting in increased spectral resolution for a given filter response, and, each time it is focussed into a port, it is filtered and the ORR increases.

Upon leaving the distal (output) ends of the fibers F3' and F3", respectively, the light beams LR and LT impinge upon detectors D' and D", respectively. The detectors D' and D" supply their corresponding electrical signals to microprocessor MP for processing in the usual way, which might entail combining them electrically. Because the first and second light beams LR and LT are kept separate until conversion to electrical signals, the microprocessor MP can extract power information independently for each of the orthogonal SOP components of the original input signal for analysis.

Of course, the detectors D' and D" could be omitted and optical fibers F3' and F3" could convey the light beams LR and LT elsewhere for subsequent detection, processing or analysis. Alternatively, the fibers F3' and F3" could be omitted and the ports P4' and P4" could be substituted by slit-detectors for directly detecting LR and LT, or a functionally equivalent detector array with associated electronics.

Wavelength selection is effected by rotating either or both of the dihedral reflector RAM1 and the diffraction grating DG. In this preferred embodiment, the dihedral reflector RAM1 is mounted upon tuning means, in the form of a turntable device TT, allowing it to be rotated relative to the diffraction grating DG for scanning through the required range of wavelengths. It should be noted that the light beams from input fibers PMF1' and PMF1" are focused onto fibers PMF2' and PMF2", respectively, while the light beams from fibers PMF2' and PMF2" are focused onto fibers F3' and F3", respectively, and that the light beams leaving secondary input ports P3' and P3" are the same as those focused onto intermediate output ports P2' and P2" that have been guided by polarization maintaining fibers PMF2' and PMF2".

Figure 11:
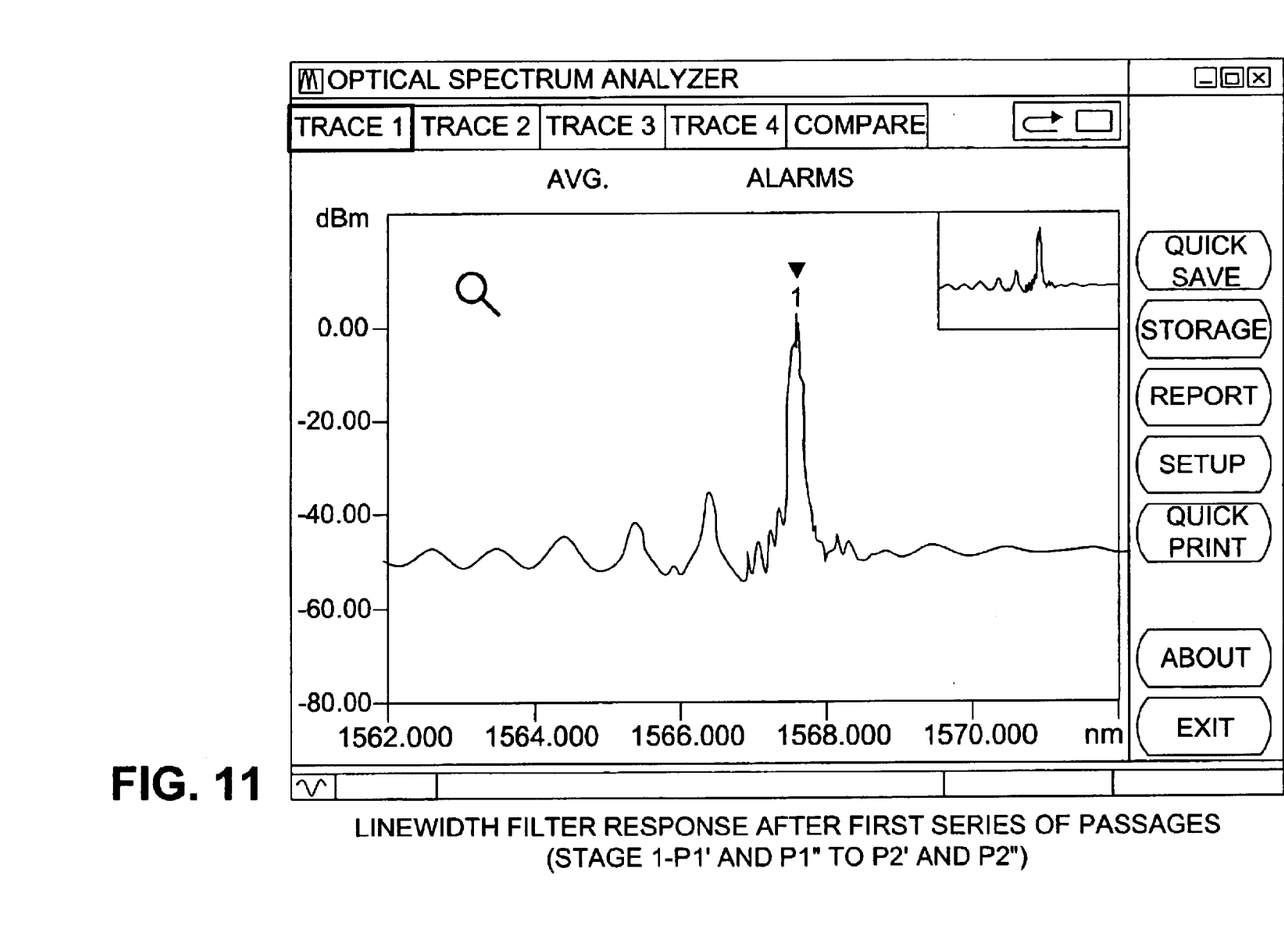
FIG. 11 illustrates linewidth filter response of only a first stage of the monochromator using a typical DFB laser source as a reference.
Figure 12:
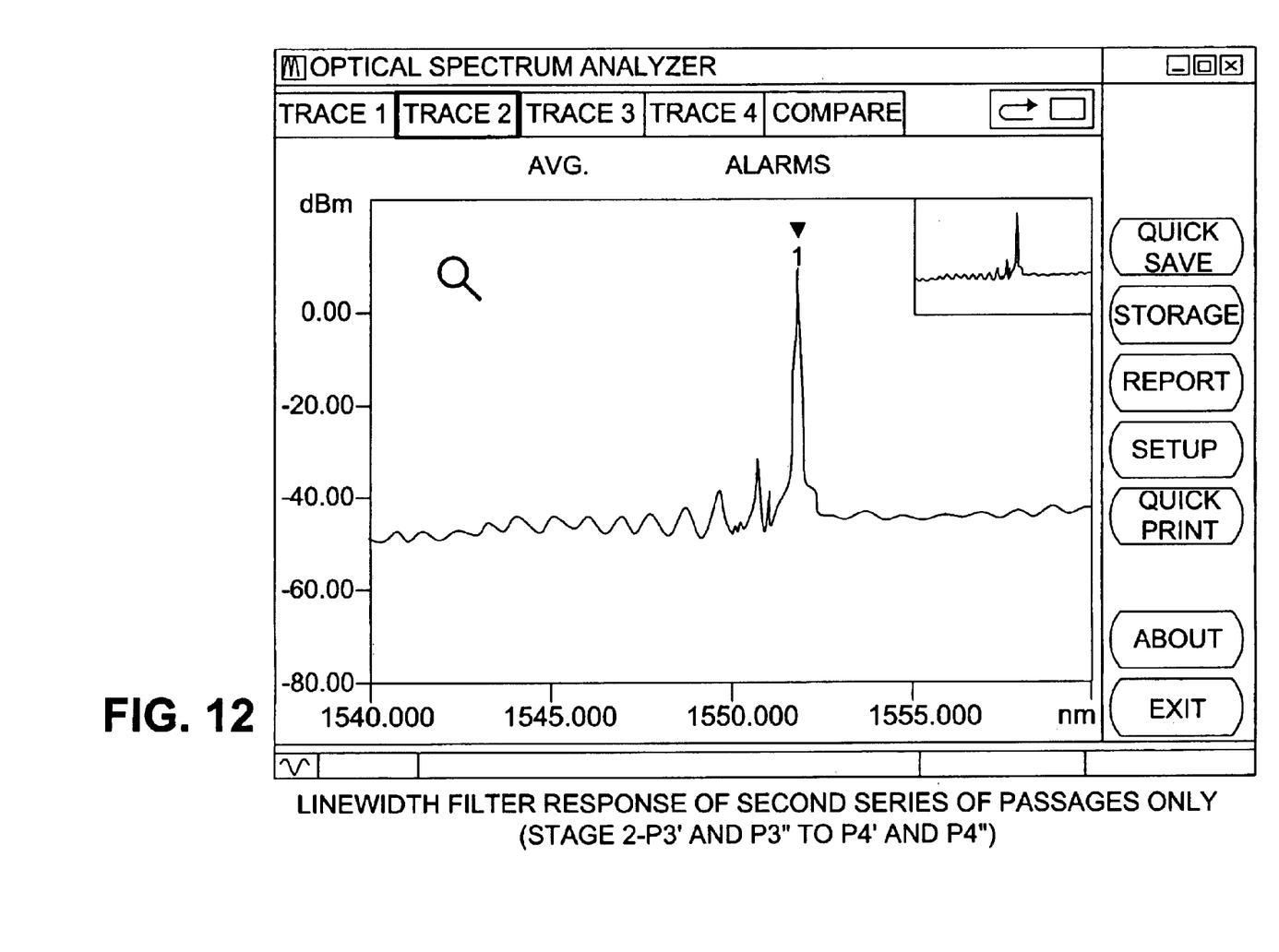
FIG. 12 illustrates linewidth filter response of only a second stage of the monochromator using the same reference DFB laser source.

It should also be noted that the alignment of the elements within the two monochromator stages, relative to the grating DG, should be controlled so as to provide wavelength-superimposed filter responses over the entire useable wavelength range as scanned by the scanning right angle mirror prism RAM1. That can be achieved by careful alignment of ports of both stages and is facilitated when the linewidth filter response of one or both of the monochromator stages is larger. In the present embodiment, the filter response of the first stage is in the order of 0.07 nm (see FIG. 11) while that of the second stage is below 0.02 nm (see FIG. 12).

Figure 8:
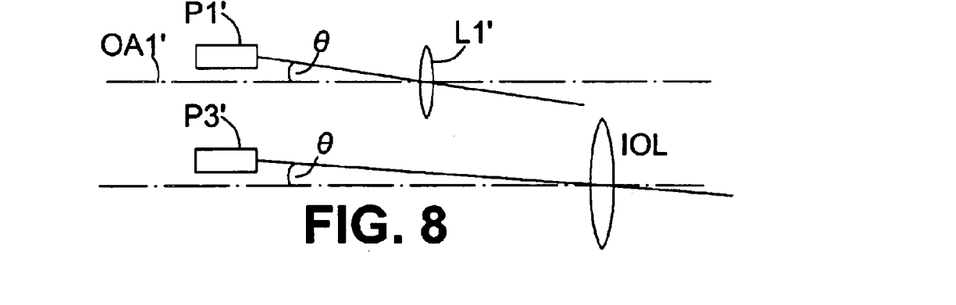
FIG. 8 illustrates relative positions of certain ports and lenses of the monochromator of either embodiment.

As illustrated in FIG. 8, port P1' (the termination of fiber PMF1'), is offset from the optical axis OA1' of lens L1 so that a line from port P1' to the middle of lens L1' is at an angle θ to the optical axis OA1'. Port P3' (of the fiber array) is offset from the optical axis $OA_{IOL}$ of lens IOL so that a line from port P3' to the middle of lens IOL is at the same angle θ to the optical axis $OA_{IOL}$. The offset of port P3 will be proportionately larger than the offset of port P1' because lens IOL has a longer focal length than lens L1' and has a longer focal length; the spacing between lens IOL and port P3' is greater, say three times greater, than the spacing between lens L1' and port P1'. Ports P1" and P3" are offset in a similar manner relative to lens L1" and lens IOL, respectively.

Keeping the angles θ small also makes the synchronization of the two series of passes easier as it requires only a small lateral displacement of the first and second input ports (P1' and P1") with respect to the collimating optics optical axis so that, in both series of passes, the light beams impinge upon the grating DG at the same angle of incidence. This angle, and the rotation angle of the scanning retroreflector, determine the wavelength selected by the monochromator. A longer focal length of one monochromator stage with regard to the other makes the synchronization more tolerant, as the spectral linewidth response of the longer focal length optics of one stage is narrower and is more easily included within the spectral linewidth response associated with the other stage, thus allowing for imperfect synchronization. This is not as critical when narrow linewidths are not required and both sets of collimating optics have short focal lengths.

Figure 13:
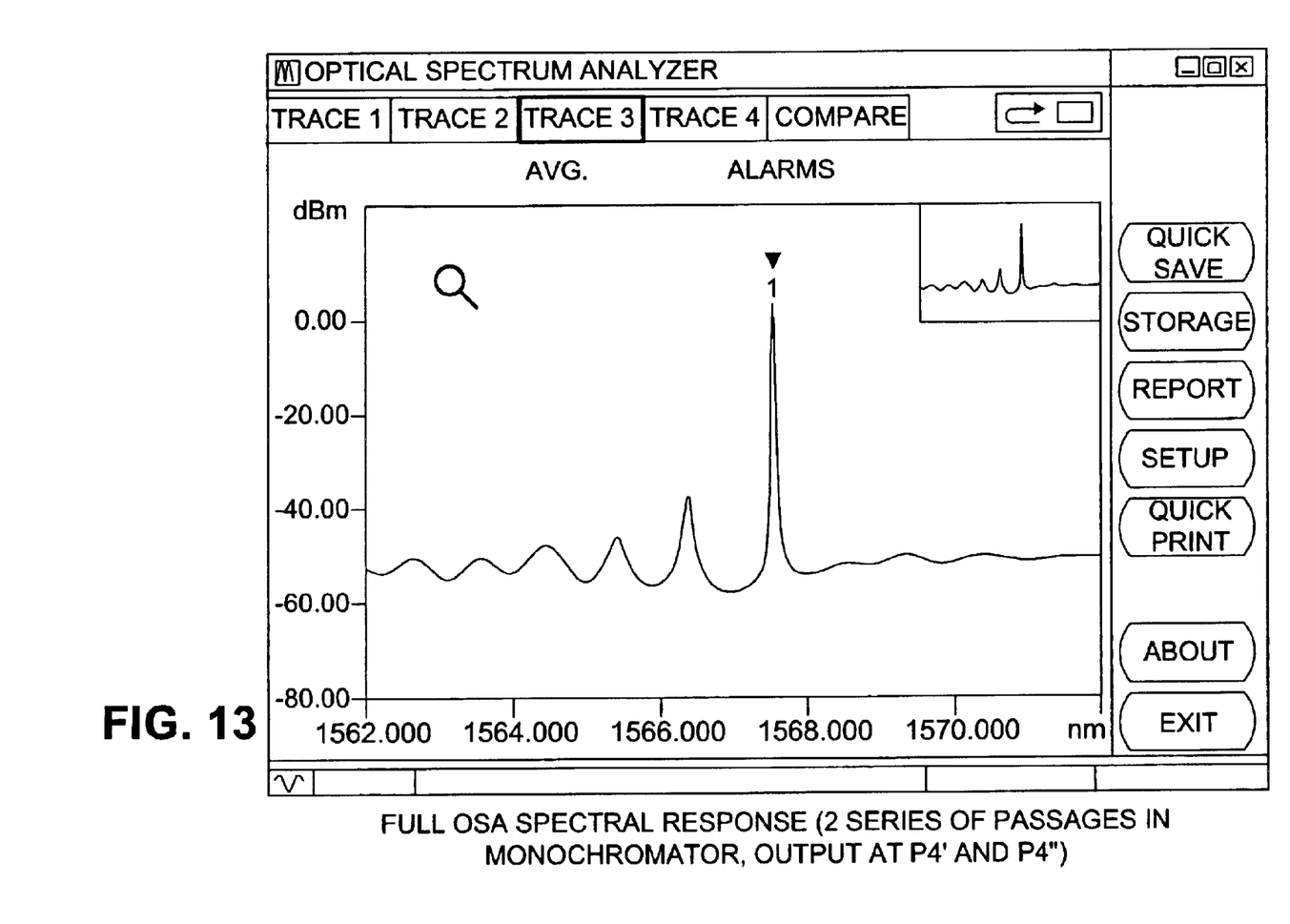
FIG. 13 illustrates full OSA spectral response after the light beams pass through both of the monochromator stages.
Figure 14:
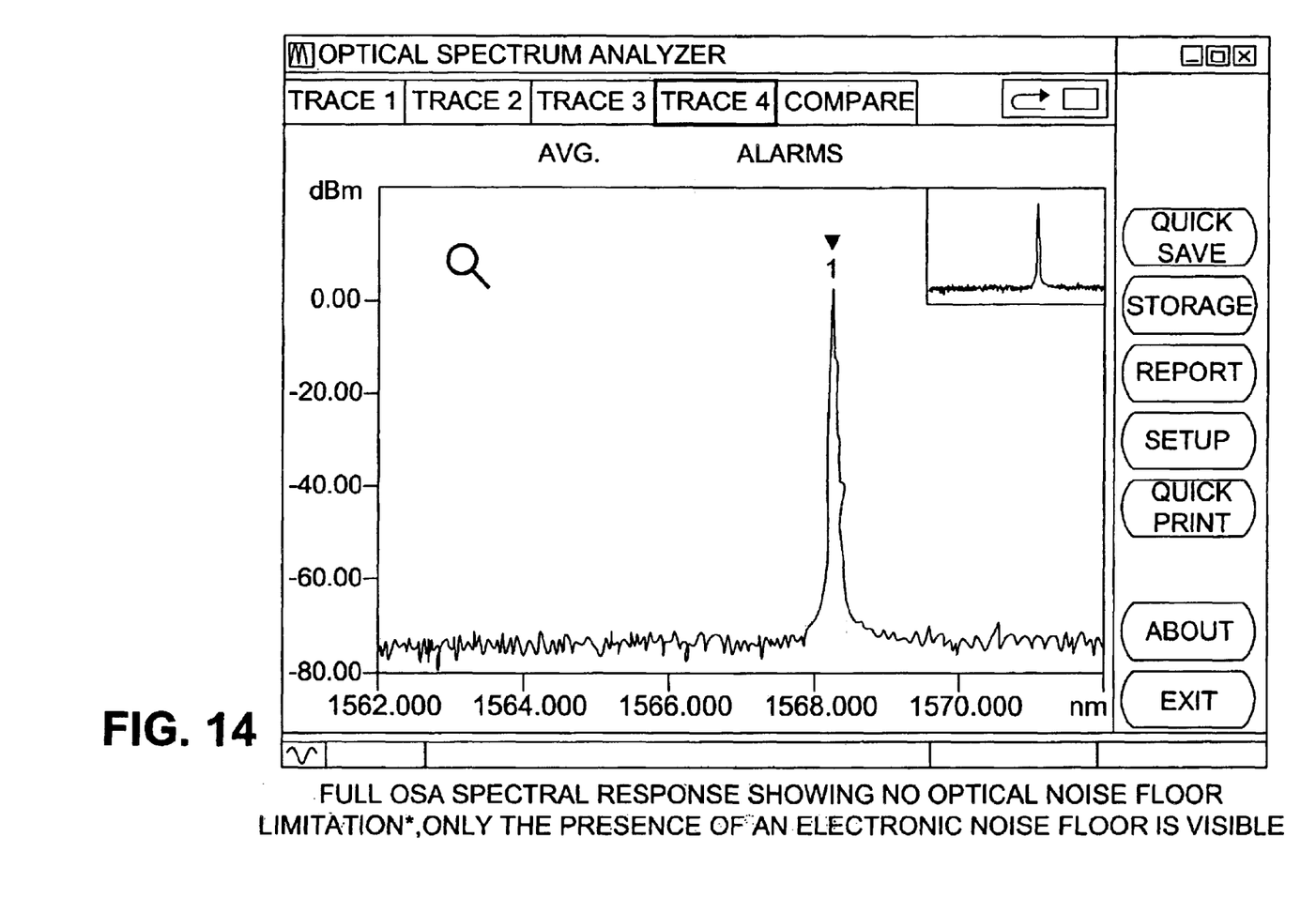
FIG. 14 illustrates full OSA spectral response using a spectrally-pure, low SSE (source spontaneous emission), single-frequency laser source and shows no optical noise floor limitation, only the presence of an electronic noise floor being visible.

The result of the complete arrangement is shown in FIG. 13 demonstrating the advantages of both a narrow linewidth and extremely high optical rejection ratio with a typical DFB laser source, and a second example in FIG. 14 shows, with a very low SSE laser source, how the optical noise floor no longer limits the ORR performance, which can be made as good as the electronics sensitivity will permit (the theoretical limit being in excess of 100 dB for the ORR of the combined optical filter response of the two monochromator stages, but could eventually be limited by minute imperfections in the components, namely the lenses and grating or scattering in the environment of the monochromator).

For each of the fiber pairs PMF2', PMF2" and F3', F3" in the fiber matrix forming ports P3', P3", P4' and P4", the inter-fiber separation is greater than the "spot size" in the non-dispersive dimension (i.e., the vertical direction of FIGS. 1, 2 and 3) of a signal in the focal plane, by such an amount that cross-talk is substantially avoided. On the other hand, the fibers are sufficiently close to each other, and to the optical axis of lens IOL, that the two beams follow nearly parallel paths in order substantially to avoid aberrations. In practice, the separation between centres is about 0.25 mm in the plane perpendicular to the dispersion plane of the grating and about 0.5 mm in the plane parallel to the dispersion axis.

Thus, light beams entering the monochromator via the input ports P1' and P1" will impinge upon the diffraction grating DG six times before exiting the monochromator via output ports P4' and P4". Each time the collimated light beam is diffracted, the dispersion increases, resulting in increased spectral resolution for a given filter response, while each time the light beam is refocussed into an optical fiber, i.e., either PMF2', PMF2" or F3', F3", it is filtered and the ORR increases. This multi-pass, double-filtering arrangement provides very narrow spectral width response and very high ORR.

It should be noted that, although the secondary input ports P3' and P3" and the output ports P4' and P4" share the same lens IOL, by this time, the light beams LR and LT comprise substantially one wavelength, i.e. that resulting from the filtering of the first monochromator stage. Consequently, any adjacent wavelengths present in the input light beam have been filtered out and can no longer contribute to back-reflection.

Figure 6:
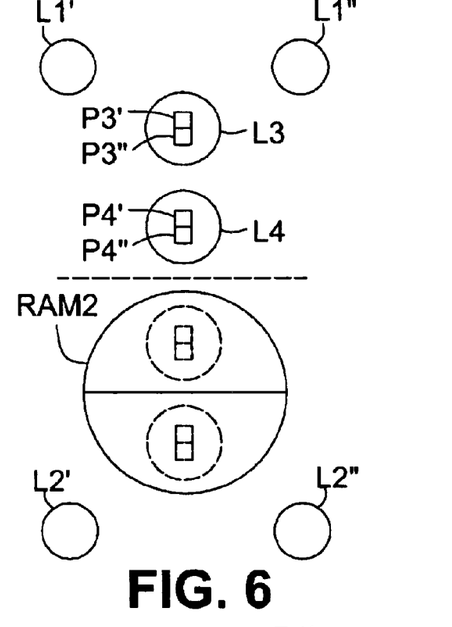
FIGS. 6 and 7 illustrate alternative configurations of collimating/focussing optics means of the monochromators.
Figure 9:
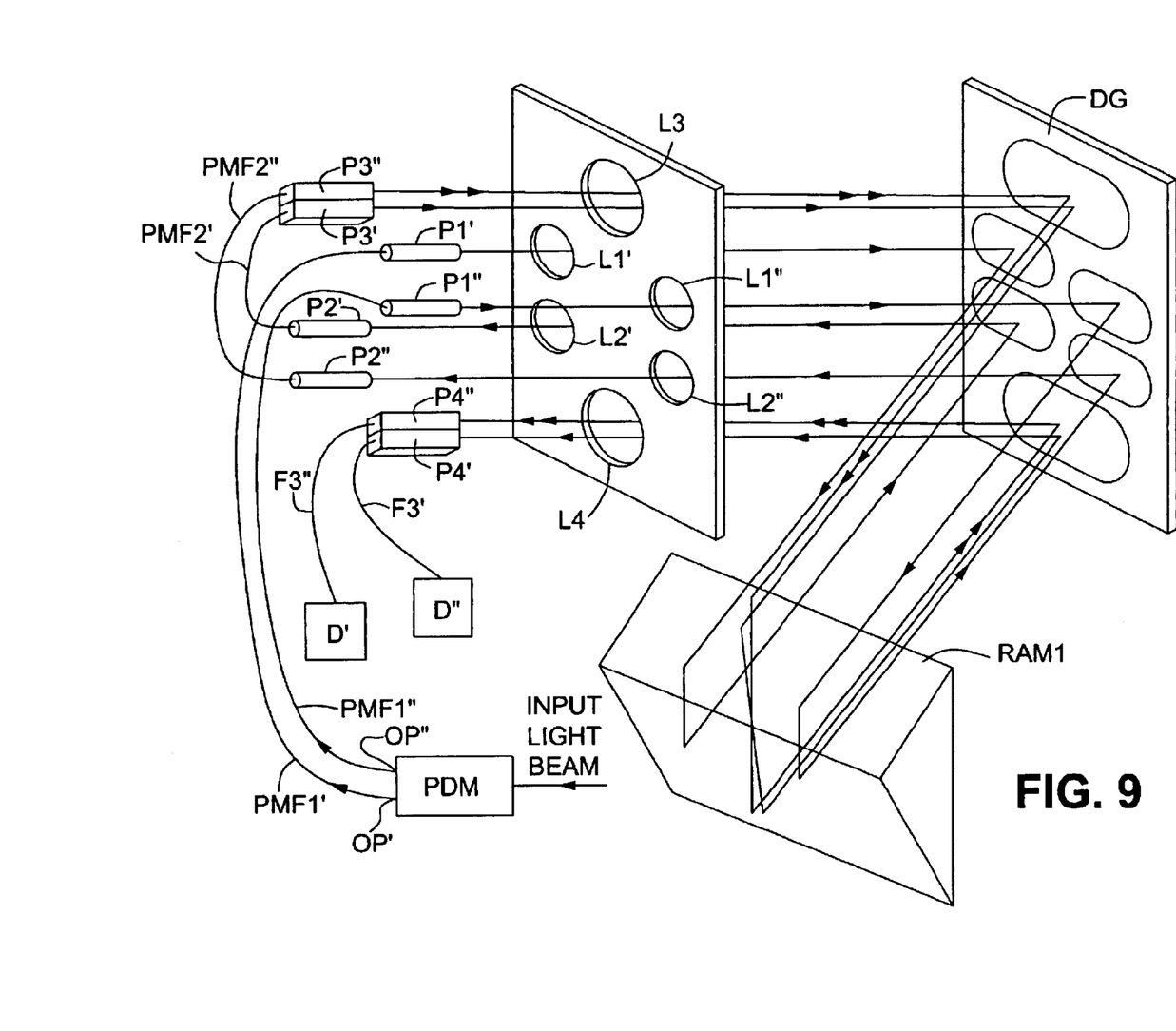
FIG. 9 is a simplified schematic diagram of an optical spectrum analyzer having a dual-channel, two-stage, multi-pass monochromator which is a second embodiment of the invention.

Nevertheless, if a wider spectral width response is tolerable, it would be possible to replace lens IOL and RAM2 with two lenses L3 and L4, as shown in FIG. 9, and replace the 2×2 fiber array with the two 1×2 fiber arrays. This would reduce to four the number of times the light is diffracted, while it would still be filtered twice. It would also be possible to use the configuration shown in FIG. 6 which shows separate lenses L3 and L4, associated with secondary input ports P3', P3" and output ports P4', P4", respectively. This arrangement has the advantage of the same high resolution as the OSA of FIGS. 1 to 5, and separate input/output lenses, but it is not as compact.

While the embodiment shown in FIGS. 1, 2, 3 and 5 has the fixed retroreflector RAM2 positioned between the secondary input ports P3', P3" and the final output ports P4', P4", it will be appreciated that retroreflector RAM2 could instead be positioned between the input ports P1', P1" and the intermediate output ports P2', P2". Preferably, however, in order to maximize dispersion, retroreflector RAM2 will be associated with the lens(es) having the longer focal length, e.g. lens IOL in the embodiment of FIG. 1 and lenses L3, L4 in the embodiment of FIG. 6.

Figure 7:
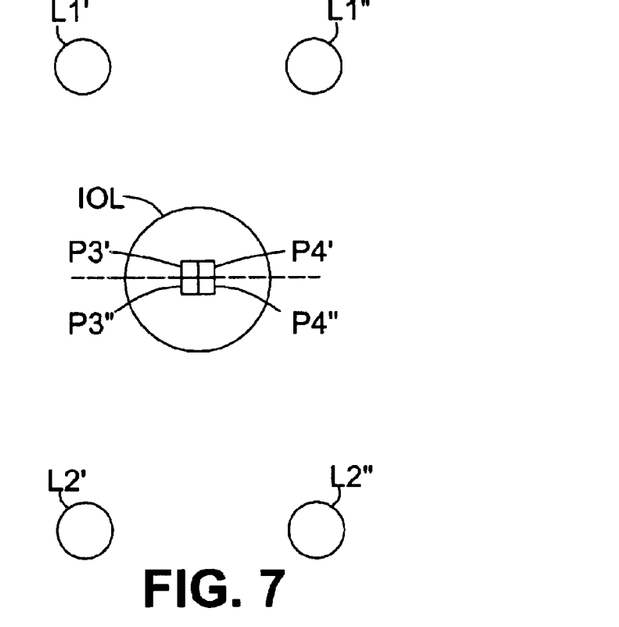

It would also be possible to omit the second retroreflector RAM2, retain the single lens IOL, and arrange the components as shown in FIG. 7.

A second embodiment of the invention, embodying some of these modifications, will now be described with reference to FIG. 9 in which components corresponding to those in FIGS. 1 to 5 have the same reference designation. Basically, retroreflector RAM2 has been omitted and lens IOL replaced by lenses L3 and L4. Also, the lenses L3 and L4 are further apart, as compared with the configuration of the optical block shown in FIG. 5 for the OSA of FIG. 1, and the lenses L1', L1", L2', L2" are between them.

Referring to FIG. 9, the polarization decomposition means PDM, as before, splits an input light beam into its first and second components having mutually-orthogonal linear SOPs and outputs them via polarization-maintaining fibers PMF1' and PMF1", respectively, to first and second input ports P1' and P1", respectively, so that, when the first and second light beams LR and LT are launched into the monochromator first stage via ports P1' and P1", respectively, their linear SOPs are parallel to each other and to the dispersion plane of the grating DG.

The first stage is similar to that of the monochromator shown in FIG. 1, the first and second light beams exiting via intermediate output ports P2' and P2", respectively, which are the proximal ends of third and fourth polarization-maintaining fibers PMF2' and PMF2", respectively. At their opposite ends, the fibers PMF2' and PMF2" terminate in a fiber array comprising secondary input ports P3' and P3", respectively, which launch the light beams into the monochromator second stage, in this case via shared lens L3 for diffraction by grating DG a third time. As before, grating DG directs the three-times diffracted light beams to retroreflector RAM1 which displaces them and returns them to the grating DG for diffraction a fourth time. On leaving the grating DG, the four-times diffracted light beams are refocussed by shared output lens L4 into ports P4' and P4" which are a second 1×2 fiber array comprising the proximal ends of output fibers F3' and F3" whose distal ends are connected to detectors D' and D", respectively.

It would also be possible to replace lenses L3 and L4 with separate lenses, the resulting optical block then having eight lenses, as illustrated in FIG. 8, each associated with a respective one of the ports, which then need not comprise fiber arrays.

It should be noted that the polarization-maintaining waveguides PMF2' and PMF2" enable the light beams to be conveyed into the second stage with their linear SOPs substantially unchanged with respect to time and wavelength. Moreover, the use of waveguides to convey the light from the first monochromator stage to the second monochromator stage permits independent alignment of the filter responses of the two stages relative to the wavelength set by the common tunable component RAM1. It also allows the filter responses of the two stages to be different, while the tuning angle is the same. Different filter responses may be obtained, for a given grating and slit arrangement, simply by using different focal lengths for the lenses in the different stages.

It should also be noted that, in any of the embodiments, the second retroreflector RAM2 could be in the first stage rather than in the second stage.

Moreover, the larger lens, which has the longer focal length, could be in the first stage rather than the second stage, providing that each stage has input and output lenses having the same focal length.

Fibers PMF2' and PMF2" (linking ports P2' and P2" to ports P3' and P3", respectively) can be elliptical-core, polarization-maintaining fibers. Elliptical cores offer the advantage of being less sensitive to misalignments on the axis perpendicular to the diffraction plane while having a limited width in the diffraction plane, the dimension which determines the filter linewidth response for a given lens-grating arrangement. Furthermore, elliptical core fibers can be used as the output fibers F3' and F3" to get the same advantage of small filter linewidth response with less sensitive optical coupling and the use of polarization maintaining fibers as said output fibers provides the further advantage of substantially eliminating the effects of polarization dependent responsivity at the detectors D' and D" by controlling the polarization state of the light reaching each detector.

Because the decomposition of the input light beams occurs outside of the free-space optics of the monochromator section, one is not constrained by such practical issues as the clear aperture of the polarization beam splitter PBS when determining the working diameters of the lenses L1', L1", L2', L2" and IOL (or L3, L4). Hence, a relatively large beam diameter can be used, facilitating the illumination of a large number of grating grooves.

Subject to practical limitations on the physical size of the equipment, the lenses and diffraction grating can be relatively large, so as to obtain better resolution but, in any case, the presented configuration will provide better resolution than with alternative known means which would use the same size of components, the grating having the same number of lines.

Figure 10:
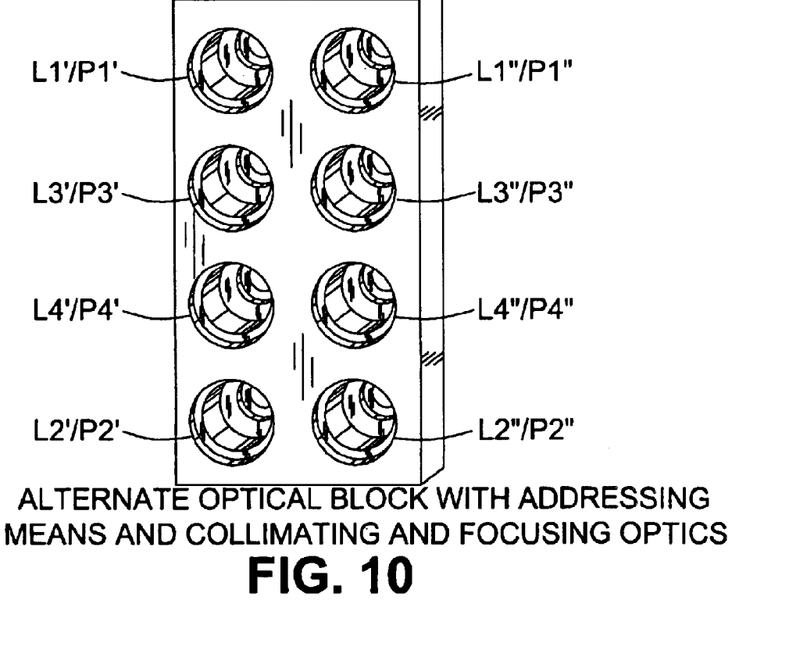
FIG. 10 is a front view of an alternative optical block offering the advantages of double filtering but only a partial optical filter linewidth response improvement.

It should be noted that the 8-lens configuration shown in FIG. 10 could be augmented by adding a second (fixed) retroreflector RAM2 to provide for two more passes on the grating DG.

It is envisaged that any or each of the lenses L1', L1", L2', L2", IOL, L3, L4 could be replaced by a concave mirror, such as an off-axis parabolic mirror, and the above-mentioned advantages still be realised.

It should be noted that, because the above-described preferred embodiments of the present invention avoid the use of a waveplate, whose polarization-transforming properties are inherently dependent upon wavelength, the linear states of polarization of the light beams LR and LT exiting the two fibers PMF1' and PMF1" as well as when exiting F3' and F3", respectively, can be oriented so as to lie in the plane of diffraction, i.e. perpendicular to the grooves, in order to minimize the losses in the monochromator stages and maximize the overall performance of the optical spectrum analyzer across a very wide wavelength range. Likewise, the absence of other inherently wavelength dependent elements, such as isolators, circulators or 3-dB couplers, allows embodiments of the present invention to maintain their performance over a wide spectral range.

It should also be noted that optical spectrum analyzers embodying the present invention using two separate detectors D' and D", which can be independently calibrated via a microprocessor, allow for increased flexibility in the optical design and alignment. For instance, although the overall performance of embodiments of this invention, in particular their optical sensitivity and the independence of this optical sensitivity to the state of polarization of the signal to be measured, is optimized when the states of polarization of the two light beams emanating from input ports P1' and P1" and from secondary ports P3' and P3", respectively, are parallel to each other and parallel to the plane of diffraction of the grating, i.e. perpendicular to the grooves, embodiments of the invention can also function with degraded sensitivity specifications if these two light beams have different, arbitrary and even wavelength-dependent states of polarization, provided that, when the light beams arrive at the output ports P4' and P4", their states of polarization do not change with time at any given wavelength. This is a consequence of the fact that, for a given state of polarization and wavelength of a beam injected into the monochromator, its orthogonal SOPs are treated separately so the polarization and wavelength dependencies of the detection can be calibrated in the microprocessor.

A further advantage of separately analyzing the two orthogonal linear SOPs of the input signal is that PMD measurements can easily be extracted by processing the two spectra.

Hence, although it is preferable to use suitably aligned polarization-maintaining fibers to rotate the state of polarization of one or each of the first and second light beams, it would be possible to use a wavelength-dependent rotation device, such as a waveplate, instead, and calibrate the optical spectrum analyzer (specifically the microprocessor) over the normal range of wavelengths so as to ensure consistent measurements at any particular wavelength. This is possible because the first and second light beams are not recombined after leaving the diffraction grating DG and before detection. As mentioned hereinbefore, however, the use of a waveplate could limit the sensitivity ultimately attainable.

The beam splitter PBS may be a conventional polarization beam splitter which typically can handle wavelengths between 400 nm and 2 $\mu$m, approximately. Such beam splitters are readily available.

It should also be noted that the diffraction grating DG could be, for example, a holographic grating, used in reflection or transmission. It is also envisaged that the tuning means could rotate the diffraction grating DG instead of, or in addition to, the dihedral prism RAM1.

It should be appreciated that the invention encompasses a monochromator formed by omitting the detectors D' and D", the microprocessor, and possibly the rotation device TT, and adding means for recombining the diffracted light beams LR and LT. Then the two light beams LR and LT could be combined optically using, for example, a polarization multiplexer or the above-described polarization beam splitter PBS in reverse.

It should also be appreciated that, although, in the preferred embodiment, the SOPs of the first and second light beams are parallel to each other and perpendicular to the grooves, for maximum diffraction efficiency, other orientations may be used for specific applications where maximum diffraction efficiency is not paramount.

Industrial Applicability

Advantageously, embodiments of the invention which use the fixed right angle mirror prism (RAM2) substantially double the linear dispersion and substantially halve the filter linewidth response as defined at half maximum.

Embodiments of the invention provide a monochromator, or an OSA embodying same, which employs multiple-passes and at least double filtering, advantageously achieving both very high spectral resolution and very high ORR.

An OSA or monochromator embodying the present invention, with Gaussian-like filtering, will have a better ORR than one using a slit with a Lambertian-like profile, especially close to the peak.

Advantageously, in embodiments of the present invention, the states of polarization of the first and second light beams do not change substantially with time regardless of typical environmental changes, such as normal fluctuation in temperature and vibration.

Moreover, an advantage of embodiments of the invention, in which the input ports and output ports are completely separate, in at least one of the two stages, is that the difficulties of back-reflection along the optical input path, and direct cross-talk between input and output, are avoided substantially completely, which is very important for high density wavelength division multiplexing (HDWDM) applications.

What is claimed is:

1. A dual-channel, double-filtering, multi-pass optical spectrum analyzer comprising:
   (i) a diffraction grating (DG);
   (ii) first and second input ports (P1', P1") for directing first and second input light beams (LR, LT), respectively, onto the diffraction grating in a first plane for dispersion a first time;
   (iii) polarization-decomposing means (PDM) for decomposing a single light beam into first and second components having mutually-orthogonal linear states of polarization and supplying said first and second components to said first and second input ports as said first and second input light beams (LR, LT), respectively,
   (iv) a retroreflector means (RAM1) for receiving the first and second dispersed light beams and returning same to the diffraction grating in a second plane for dispersion a second time;
   (v) first and second intermediate output ports (P2', P2") for receiving the first and second twice-dispersed light beams, respectively;
   (vi) first and second secondary input ports (P3', P3") coupled to the first and second intermediate output ports, respectively, by polarization-maintaining waveguide means (PMF2', PMF2") and for directing the twice-dispersed first and second light beams onto the diffraction grating in a third plane for dispersion a third time, with their states of polarization having a predetermined orientation relative to the states of polarization of the first and second light beams when first incident upon the diffraction grating, the retroreflector means (RAM1) reflecting the three-times-dispersed first and second light beams back to the diffraction grating means in a fourth plane for dispersion a fourth time;
   (vii) first and second output ports (P4', P4") for receiving the first and second light beams, respectively, after dispersion the fourth time, the first, second, third and fourth planes being parallel to each other and the dispersion plane and spaced from each other in a direction perpendicular to the dispersion plane;
   (viii) means (TT) for rotating at least one of the first retroreflector and the grating to effect wavelength scanning;
   (ix) first and second detectors (D', D") for receiving the first and second light beams from the first and second output ports (P4', P4"), respectively, and converting same to first and second electrical signals, respectively; and
   (x) microprocessor means (MP) coupled to said rotating means (TT) and to the detectors (D', D") for controlling rotation of the first retroreflector (RAM1) and processing the first and second electrical signals;

the arrangement being such that, each time the first and second light beams are incident upon the diffraction grating, their linear states of polarization are substantially parallel to each other and the dispersion planes for all wavelengths within an operating band of the optical spectrum analyzer.

2. An optical spectrum analyzer according to claim 1, wherein said first and second secondary input ports (P3', P3") and said first and second output ports (P4', P4") comprise a rectangular fiber array and share a single optical collimating/focussing means having an optical axis extending through the centre of the rectangular fiber array, the first and second secondary input ports (P3', P3") being in a first plane substantially perpendicular to the dispersion plane and the first and second output ports (P4', P4") being in a second plane substantially perpendicular to the dispersion plane, the first secondary input port (P3') and the first output port (P4') being disposed adjacent each other in another plane that is parallel to the diffraction plane, and the second secondary input port (P3") and the second output port (P4") being disposed in yet another plane parallel to the diffraction plane.

3. An optical spectrum analyzer according to claim 1, wherein the first and second secondary input ports (P3', P3") comprise a first fiber array disposed in the focal plane of a single collimating lens means (L3) and the first and second output ports (P4', P4") comprise a second fiber array disposed in the focal plane of a single focussing lens means (L4).

4. An optical spectrum analyzer according to claim 1, wherein the first and second input ports (P1', P1") and the first and second secondary input ports (P3', P3") are each associated with a respective one of a set of four separate collimating lens means (L1', L1", L3', L3") and the first and second intermediate output ports (P2', P2") and first and second output ports (P4', P4") are each associated with a respective one of a set of separate focussing lens means (L2', L2", L4', L4").

5. An optical spectrum analyzer according to claim 1, further comprising a second retroreflector (RAM2) for providing for dispersion of the first and second light beams two more times before reaching the first and second output ports, respectively.

6. An optical spectrum analyzer according to claim 5, wherein the second retroreflector (RAM2) is disposed for receiving the first and second light beams after they have been directed into the monochromator by the first and second secondary input ports, dispersed by the grating, reflected by the first retroreflector means and dispersed again by the grating, and returning the first and second light beams for dispersion yet again by the grating, reflection yet again by the first retroreflector, and dispersion once more by the grating before reading said first and second output ports (P4', P4").

7. An optical spectrum analyzer according to claim 1, wherein the first and second input ports (P1', P1") direct the first and second light beams (LR, LT) onto said grating (DG) with their linear states of polarization parallel to each other and parallel to a plane of dispersion of the diffraction grating, and such that, when directed onto the diffraction grating by the first and second secondary input ports (P3', P3") the linear SOPs of the twice-dispersed light-beams are parallel to the linear SOPs of the first and second input light beams when incident upon the diffraction grating (DG) the first time.

8. An optical spectrum analyzer according to claim 1, wherein a first stage comprising the optical path between the first and second input ports (P1', P1") and the first and second intermediate output ports (P2', P2") and a second stage comprising the optical path between the first and second secondary input ports (P3', P3") and the first and second output ports (P4', P4"), each have a Gaussian-like optical filter response, the optical filter response linewidth of one stage being greater than that of the other stage, the first and second input ports and the first and second secondary input ports being aligned so that, in both stages, the light beams are incident upon the grating at the same angle of incidence.

9. A dual-channel, double-filtering, multi-pass monochromator comprising:
(i) a diffraction grating (DG);
(ii) first and second input ports (P1', P1") for directing first and second input light beams (LR, LT), respectively, onto the diffraction grating in a first plane for dispersion a first time;
(iii) a retroreflector means (RAM1) for receiving the first and second dispersed light beams and returning same to the diffraction grating in a second plane for dispersion a second time;
(iv) first and second intermediate output ports (P2', P2") for receiving the first and second twice-dispersed light beams, respectively;
(v) first and second secondary input ports (P3', P3") coupled to the first and second intermediate output ports, respectively, by polarization-maintaining waveguide means (PMF2', PMF2") for directing the twice-dispersed first and second light beams onto the diffraction grating in a third plane for dispersion a third time, with their states of polarization having a predetermined orientation relative to the states of polarization of the first and second light beams when first incident upon the diffraction grating, the retroreflector means (RAM1) reflecting the three-times-dispersed first and second light beams back to the diffraction grating means in a fourth plane for dispersion a fourth time; and
(vi) first and second output ports (P4', P4") for receiving the first and second light beams, respectively, after dispersion the fourth time, the first, second, third and fourth planes being parallel to each other and the dispersion plane and spaced from each other in a direction perpendicular to the dispersion plane.

10. A monochromator according to claim 9, wherein said first and second secondary input ports (P3', P3") and said first and second output ports (P4', P4") comprise a rectangular fiber array and share a single optical collimating/focussing means having an optical axis extending through the centre of the rectangular fiber array, the first and second secondary input ports (P3', P3") being in a first plane substantially perpendicular to the dispersion plane and the first and second output ports (P4', P4") being in a second plane substantially perpendicular to the dispersion plane, the first secondary input port (P3') and the first output port (P4') being disposed adjacent each other in another plane that is parallel to the diffraction plane, and the second secondary input port (P3") and the second output port (P4") being disposed in yet another plane parallel to the diffraction plane.

11. A monochromator according to claim 9, wherein the first and second secondary input ports (P3', P3") comprise a first fiber array disposed in the focal plane of a single collimating lens means (L3) and the first and second output ports (P4', P4") comprise a second fiber array disposed in the focal plane of a single focussing lens means (L4).

12. A monochromator according to claim 9, wherein the first and second input ports (P1', P1") and the first and second secondary input ports (P3', P3") are each associated with a respective one of a set of four separate collimating lens means (L1', L1", L3', L3") and the first and second intermediate output ports (P2', P2") and first and second output ports (P4', P4") are each associated with a respective one of a set of separate focussing lens means (L2', L2", L4', L4").

13. A monochromator according to claim 9, further comprising a second retroreflector (RAM2) for providing for dispersion of the first and second light beams two more times before reaching the first and second output ports, respectively.

14. A monochromator according to claim 13, wherein the second retroreflector (RAM2) is disposed for receiving the first and second light beams after they have been directed into the monochromator by the first and second secondary input ports, dispersed by the grating, reflected by the first retroreflector means and dispersed again by the grating, and returning the first and second light beams for dispersion yet again by the grating, reflection yet again by the first retroreflector, and dispersion once more by the grating before reading said first and second output ports (P4', P4").

15. A monochromator according to claim 9, wherein the first and second input ports (P1', P1") direct the first and second light beams (LR, LT) onto said grating (DG) with their linear states of polarization parallel to each other and parallel to a plane of dispersion of the diffraction grating, and such that, when directed onto the diffraction grating by the first and second secondary input ports (P3', P3") the linear SOPs of the twice-dispersed light-beams are parallel to the linear SOPs of the first and second input light beams when incident upon the diffraction grating (DG) the first time.

16. A monochromator according to claim 9, wherein a first stage comprising the optical path between the first and second input ports (P1', P1") and the first and second intermediate output ports (P2', P2") and a second stage comprising the optical path between the first and second secondary input ports (P3', P3") and the first and second output ports (P4', P4"), each have a Gaussian-like optical filter response, the optical filter response linewidth of one stage being greater than that of the other stage, the first and second input ports and the first and second secondary input ports being aligned so that, in both stages, the light beams are incident upon the grating at the same angle of incidence.

17. A double-filtering, multi-pass monochromator comprising:
(i) a diffraction grating;
(ii) a first port for directing an input light beam onto the diffraction grating for dispersion a first time;
(iii) a retroreflector means for receiving the dispersed light beam and returning same to the diffraction grating for dispersion a second time;
(iv) a second port for receiving the twice-dispersed light beam;
(v) a third port coupled to the second port by a waveguide and for directing the twice-dispersed light beam onto the diffraction grating for dispersion a third time, the retroreflector means reflecting the thrice-dispersed light beam back to the diffraction grating for dispersion a fourth time;
(vi) a fourth port for receiving the four-times dispersed light beam from the diffraction grating.

* * * * *